Aug. 14, 1956  A. MEYER ET AL  2,758,457
OVERRIDING CLUTCH

Filed Oct. 4, 1954  3 Sheets-Sheet 1

INVENTORS
SPENCER BOWMAN &
ANDREW MEYER
BY
ATTORNEY

Aug. 14, 1956     A. MEYER ET AL     2,758,457
OVERRIDING CLUTCH

Filed Oct. 4, 1954     3 Sheets-Sheet 2

INVENTORS
SPENCER BOWMAN &
ANDREW MEYER

BY

*John E. Renfro*

ATTORNEY

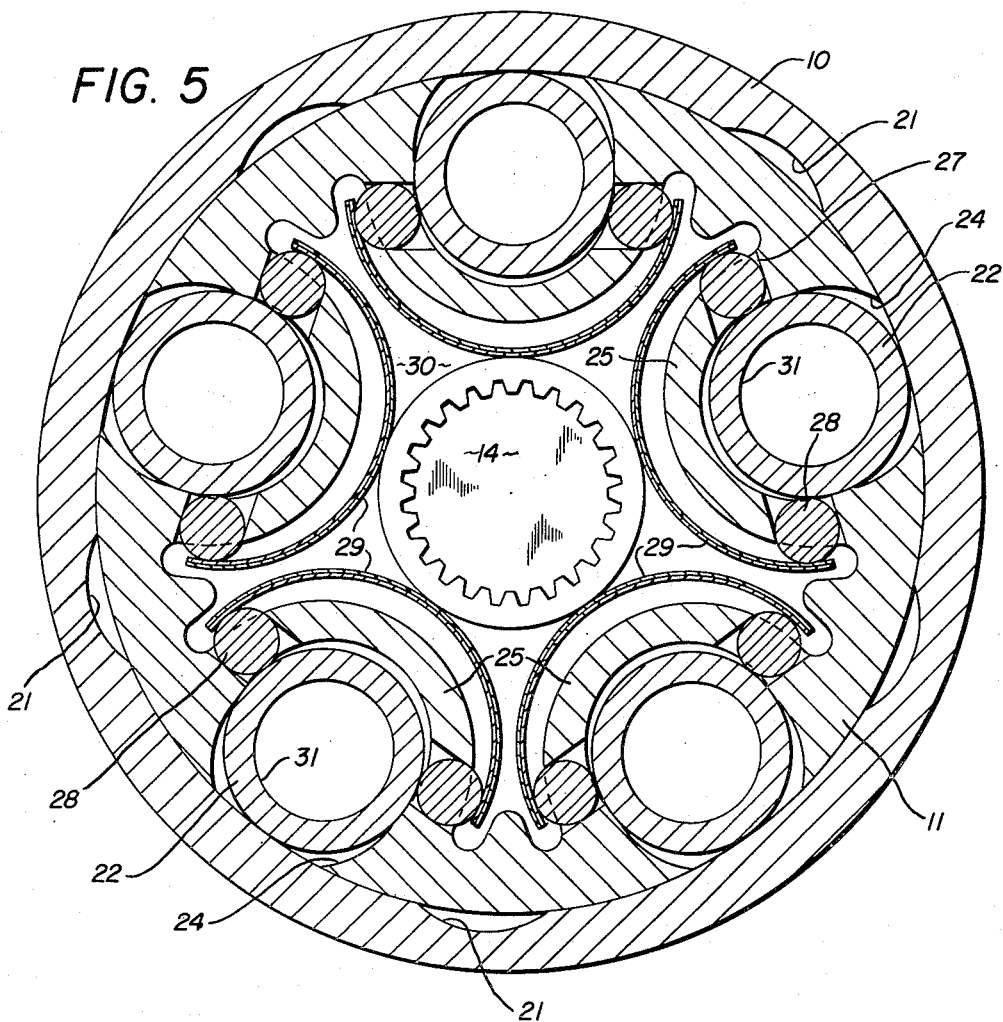

United States Patent Office 2,758,457
Patented Aug. 14, 1956

2,758,457

OVERRIDING CLUTCH

Andrew Meyer, Cleveland Heights, and Spencer Bowman, Lakewood, Ohio, assignors to Cleveland Rock Drill Division, Westinghouse Air Brake Company, Pittsburgh, Pa., a corporation of Pennsylvania Application October 4, 1954, Serial No. 460,146

11 Claims. (Cl. 64—29)

This invention relates broadly to clutches, but more particularly to an overriding clutch mechanism, wherein the clutch is automatically released when the torque transmitted thereby reaches a predetermined maximum.

One object of this invention is to produce a novel clutch mechanism, constructed and arranged in a manner enabling it to readily override once the designed torque is exceeded.

Another object of this invention is to produce a torque limiting device, equipped with torque transmitting elements readily releasable once the designed load is exceeded.

Another object of this invention is to provide such a clutch with releasable torque transmitting elements affording adequate wearing surfaces and which will operate smoothly with a minimum of vibration.

Another object of this invention is to provide an overriding clutch equipped with releasable torque transmitting elements urged into operative position by novel means affording a simple and efficient construction.

These objects are accomplished by a construction free of complication, and by an arrangement of parts resulting in a compact unit which is strong, durable and efficient.

In the drawings which illustrate a preferred embodiment of the invention:

Figure 5 is a view similar to Figure 2 but illustrating the parts in different positions.

Figure 3:
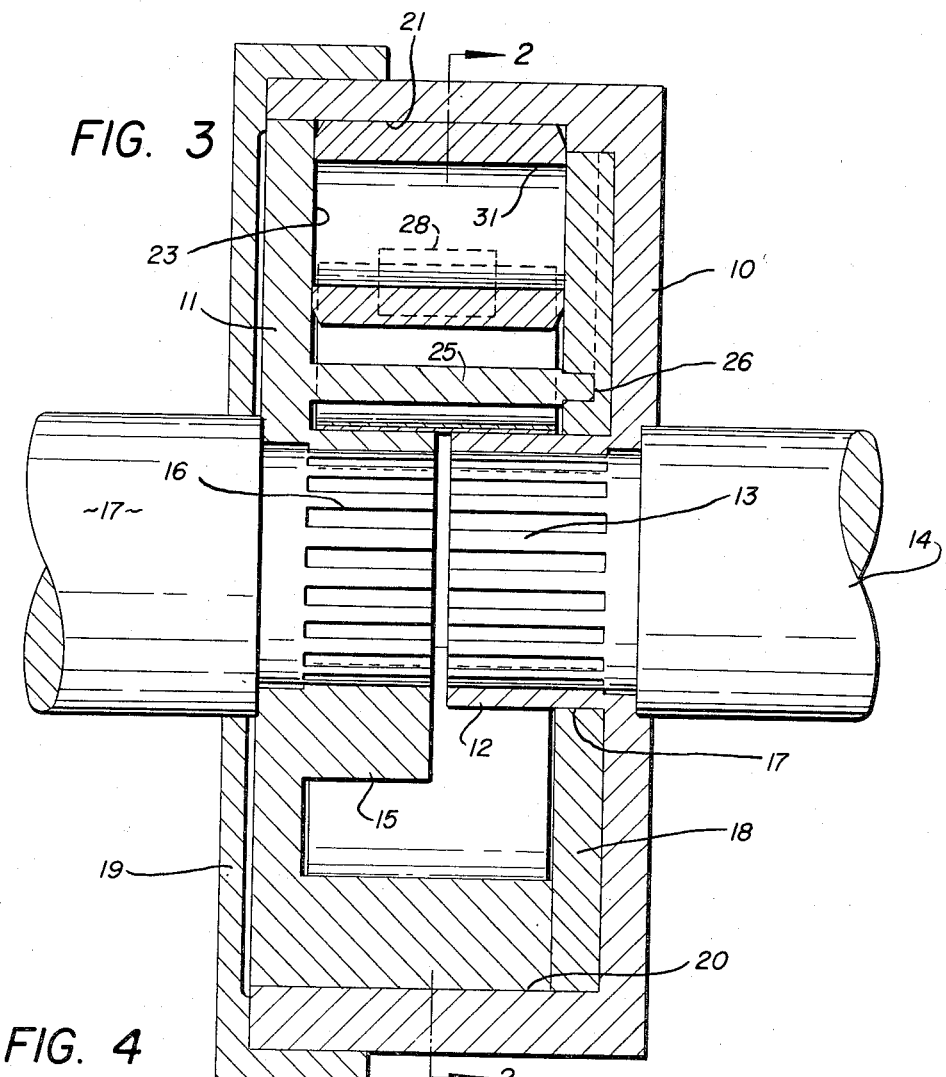
Figure 3 is longitudinal sectional view taken on line 3—3 in Figure 2.
Figure 4:
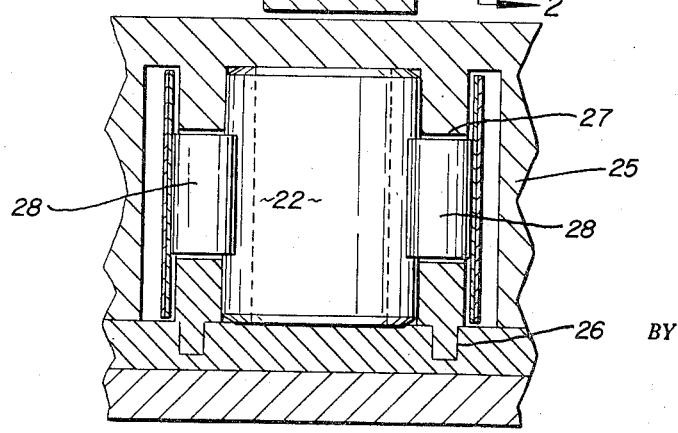
Figure 4 is a fragmental longitudinal sectional view taken on line 4—4 in Figure 2.

Referring to the drawings and more particularly to Figure 3, 10 and 11 designate two cylindrical axially aligned clutch members. The member 10 is preferably cup shaped and has a central hub 12 extending inwardly from the bottom thereof, which hub is splined on the inner end portion 13 of a shaft 14.

Clutch member 11 is also substantially cup shaped and inverted within member 10 with a hub 15 extending inwardly and splined on the inner end portion 16 of a shaft 17. A plate 18 interposed between the two clutch members is loosely fitted within the bottom of the clutch member 10. A cap 19 fitted over the open end of the member 10 and secured thereon by any suitable means such as a screw threaded connection, not shown, prevents separation of the clutch members and also acts as a reinforcing bond around the open end of the clutch member 10 to prevent it from flaring outwardly by virtue of the radial forces to which it is submitted, as hereinafter explained.

Figure 1:
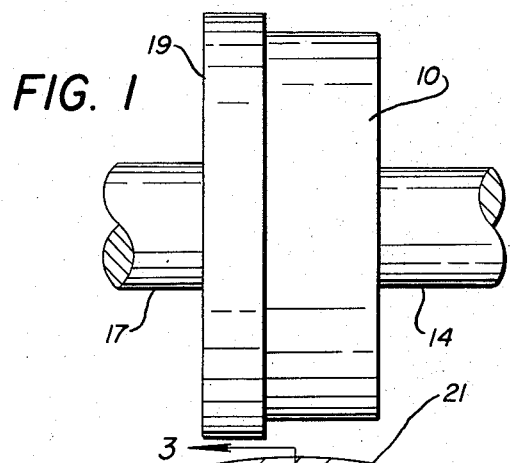
Figure 1 is a small side elevational view of a device embodying the invention.
Figure 2:
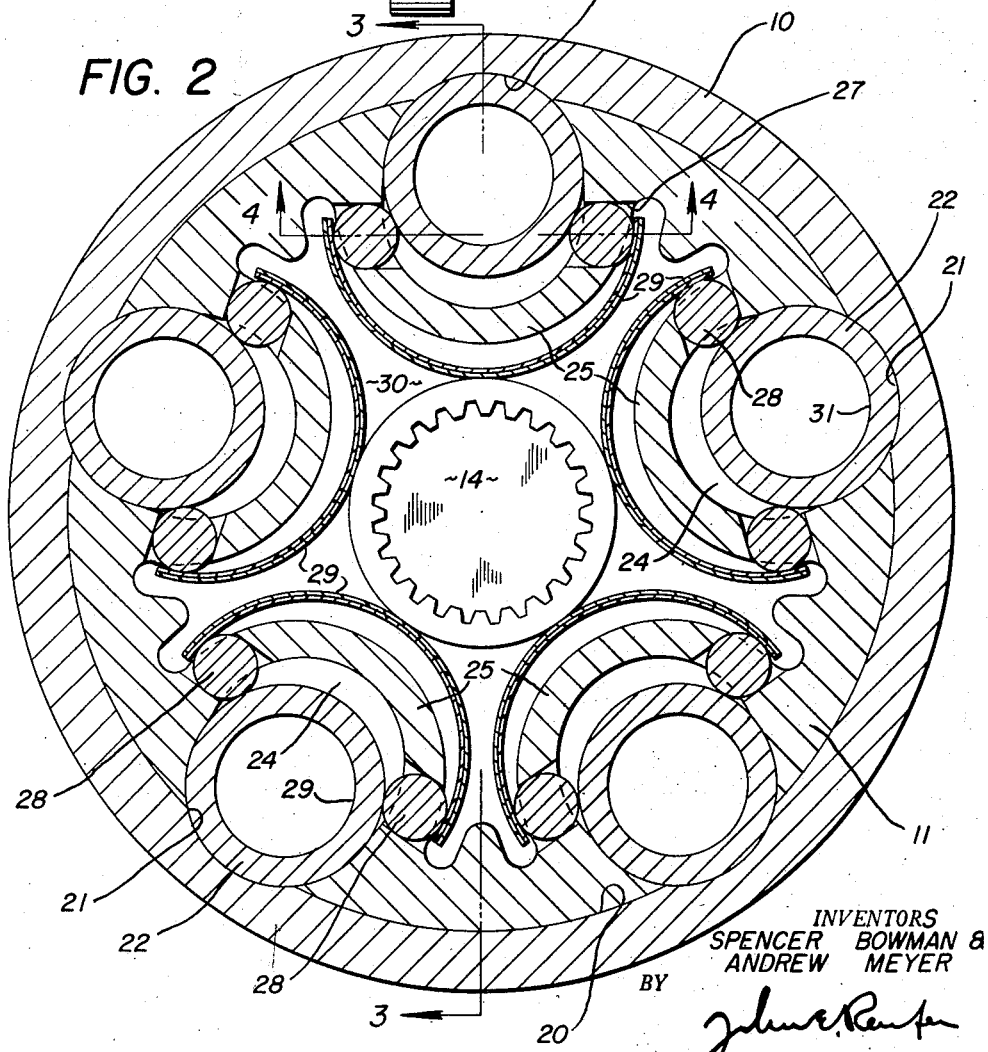
Figure 2 is an enlarged cross-sectional view taken on line 2—2 in Figure 3 and looking in the direction of the arrows.

The inner peripheral wall 20 of the clutch member 10 is provided with a plurality, five in this instance, of longitudinally extending equally spaced recesses 21 of partly cylindrical cross-section. All recesses are alike and extend lengthwise from the open end of the member to the plate 18 in parallel relation with the center axis of the unit. Each recess has seated therein a torque transmitting element in the form of a roller 22 extending lengthwise from the bottom 23 of the clutch member 11 to the plate 18. The roller 22 is loosely fitted within a cavity 24 provided within the clutch member, in parallel alignment with the center axis thereof and opening through its peripheral wall. The width of the opening is smaller than the diameter of the roller, whereby the roller is retained in the cavity, while the width and length of the cavity is substantially equal to the diameter and length respectively of the roller. The radial depth of each cavity taken from the peripheral wall of the clutch member 11 is somewhat greater than the diameter of the roller, thereby enabling the roller to be withdrawn from the recess 21 and entirely accommodated within the cavity 24. Each cavity 24 is defined by an arcuated wall 25 extending longitudinally from the bottom 23 of the member 11 and ending within a correspondingly shaped recess 26 formed within the plate 18. The wall 25 of each cavity 24 is provided with two diametrically opposed rectangular slots 27 extending longitudinally of the wall and equally spaced from the ends thereof. As clearly shown in Figure 2, the slots are located one on each side of the bottom of the recess 21, with an angle having the center of the roller 22 as its vertex, of substantially 120° between the bottom of recess 21 and each slot 27. Each slot has loosely mounted therein a thrust member in the form of a cylindrical pin 28 of a diameter larger than the thickness of the wall 25, thereby enabling it to protrude radially inward into contact with the roller 22 and also outwardly for engagement by one end of a leaf spring 29. Between the walls 25 of the cavities 24 and the hubs 13 and 16 of the clutch members 10 and 11, is molded or otherwise provided a spring chamber 30 adapted to accommodate the springs 29. Each spring extends in width substantially the full length of the wall 25 and is installed in operative position by first deflecting it from a more pronounced arcuated shape to fit with its ends on the pins 28 and its back against portions of the hubs 13 and 16.

In the operation of the device, it is to be understood that either clutch member 10 or 11 may become the driving member connected to a source of rotary power through its shaft 14 or 17. With reference to Figure 3, if it is assumed that 10 is the driving member, it will be understood that as long as the designed torque is not exceeded, the rollers 22 are maintained by the spring loaded thrust members 28 into the recesses 21 for transmitting rotation to the member 11. In other words, the rollers 22 are engaged by the pins 28 at places whereby pressure exerted on the pins toward each other causes the rollers to be urged and normally maintained into the recesses 21 for transmitting torque from one clutch member to another. When the designed torque is exceeded either outer end portions of the recesses 21, depending upon the direction the torque is applied, effect a camming action on the rollers 22 to drive them inwardly against the spring pressed pins 28 and out of the recesses 21, as clearly shown in Figure 5, thereby enabling the driving clutch member to override the driven one. During this override, as the rollers 22 are out of the recesses, the drive clutch member will speed up to develop its output power while the drive member is slowed down or stopped entirely. As the rollers 22, during relative rotation of the two clutch members, re-engage the recesses 21 by virtue of the constant outward force exerted on the rollers by the pins 28, they will deliver a rotary impact to the edge portions of the recesses 21. This sudden reengagement of the rollers with the driving clutch member again move the rollers inwardly, which inward movement is absorbed and checked by the spring loaded pins 28 for dissipating the energy created by such impacts. This overriding of the clutch members in effect imparts reciprocatory motion to the rollers 22, which continues until the driving member is stopped, or until the torque to be transmitted from one member to the other again falls below the designed maximum.

The initial torque to be transmitted by the device starting from a static condition, is a function of the force of the springs 29 applied to the rollers 22 through the pins 28, and also of the depth of the recesses 21. The torque transmitted by the device at full speed is a function of the springs 29 and depth of recesses 21 together with the centrifugal force of the rollers 22. Since the centrifugal force is a function of mass, it can be varied by changing the weight of the rollers. To that end, the rollers are preferably made with a bore 31 extending centrally therethrough, the diameter of which may be changed to vary the centrifugal force and its effect in the amount of torque to be transmitted. Similarly, the clutch device can be made for instance to transmit higher torque by replacing the springs 29 by heavier ones or by replacing the clutch member 10 with one having deeper recesses 21, or both.

Since the rollers or torque transmitting members 22 are loosely mounted with the cavities 24, they will, during the overriding of the clutch, roll on their own axes, thereby presenting different areas for contact with the edges of the recesses 21. In other words, each roller has a wear surface equivalent to its peripheral wall. Similarly, the pins 28 freely mounted within the slots 27, will be subjected to a vibratory motion resulting from the overriding of the clutch, and thereby caused to rotate slowly on their own axes and present to the rollers contact or wearing surfaces equivalent to their peripheral walls.

The details of structure and arrangement of parts shown and described may be variously changed and modified without departing from the spirit and scope of the invention.

I claim:

1. In a clutch, first and second aligned clutch members capable of relative rotation, a plurality of elongated equally spaced recesses within said first member, torque transmitting elongated elements within said second member protruding therefrom into said recesses, said elements being individually movable to and from said recesses, and a pair of thrust members spring biased toward each other for each of said elements engaging same at places to urge and normally maintain the element biased into one of said recesses to transmit rotation between said members but enabling said elements to move out of said recesses to permit overriding of said clutch members during certain conditions of operation.

2. In a clutch, first and second aligned clutch members capable of relative rotation, a plurality of elongated equally spaced recesses within said first member, elongated rotatable elements within cavities of the second member protruding therefrom into said recesses, said cavities being of a size enabling withdrawal of said elements from said recesses within the confines of said second chamber, and a pair of thrust members spring biased toward each other urging and normally maintaining each of said elements biased into one of said recesses to transmit rotation between said members but enabling said withdrawal to permit overriding of said clutch members under certain conditions of operation.

3. In a clutch, first and second aligned clutch members capable of relative rotation, a plurality of elongated equally spaced recesses within said first member, elongated rotatable elements within cavities of the second member protruding therefrom into said recesses, said cavities being of a size enabling withdrawal of said elements from said recesses within the confines of said second member, a pair of thrust members within the walls of said cavities spring biased toward each other into rotary engagement with said elements to urge and normally maintain them into said recesses to transmit rotation between said members but enabling said withdrawal to permit overriding of said clutch members under certain conditions of operation.

4. In a clutch, first and second aligned clutch members capable of relative rotation, a plurality of elongated equally spaced recesses within said first member, elongated rotatable elements within cavities of the second member protruding therefrom into said recesses, said cavities being of a size enabling withdrawal of said elements from said recesses within the confines of said second member, thrust pins within the walls of said cavities rotatably engaging said elements, and spring means outside of said cavities active on said pins to urge and normally maintain said elements biased into said recesses to transmit rotation between said members but enabling said withdrawal to permit overriding of said members under certain conditions of operation.

5. In a clutch, first and second aligned clutch members capable of relative rotation, a plurality of elongated equally spaced recesses within said first member of symmetrical shape on both sides of the center line thereof, elongated rotatable elements within cavities of the second member protruding therefrom into said recesses, said cavities being of a size enabling withdrawal of said elements from said recesses within the confines of said second member, a pair of thrust pins within the wall of each cavity rotatably engageable with their respective element on each side and at substantially 120° from said center line, and spring means outside of said cavities active on said pins to urge and normally maintain said elements biased into said recesses to transmit rotation between said members but enabling said withdrawal to permit overriding of said members under certain conditions of operation.

6. In a clutch, a pair of cylindrical clutch members, one fitted within the other for relative rotation therebetween, elongated semi-circular equally spaced recesses within the inner wall of the outer member in parallel alignment with the center axis thereof, cavities within the inner members opening through the outer wall thereof, rollers within said cavities protruding through the openings thereof into said recesses in parallel alignment therewith to transmit torque between said members, said cavities being of a size enabling withdrawal of said rollers from said recesses within the confines of said inner member to enable overriding of one clutch member relative to the other when said torque reaches a predetermined maximum, a pair of thrust pins rotatably engaging each roller at places whereby pressure exerted on said pins toward each other causes said roller to be urged and normally maintained within one of said recesses, and resilient means for each pair of thrust pins exerting said pressure thereon but capable of flexing to enable the withdrawal aforesaid of rollers from said recesses.

7. In a clutch, an external and an internal axially aligned clutch member, each having a concentric cylindrical portion one within the other in rotatable engagement therewith, a plurality of elongated semi-circular equally spaced recesses within the inner wall of the external member in parallel alignment with the center axis thereof, a plurality of cavities within the inner member each having an opening through the outer wall thereof, rollers within said cavities protruding through the openings thereof into said recesses to transmit torque between said members, the width of said openings adjacent the recesses being smaller than the diameter of said rollers whereby said rollers are retained within said cavities, said cavities being of a size enabling withdrawal of said rollers from said recesses within the confines of said inner member to enable overriding of one clutch member relative to the other when said torque reaches a predetermined maximum, a pair of thrust elements within the wall of each cavity rotatably engaging the roller within said cavity at places whereby pressure exerted on said elements toward each other urges and normally maintains said roller within one of said recesses, and resilient means exerting said pressure on said elements capable of flexing to enable the withdrawal aforesaid of the rollers from said recesses.

8. In a clutch, first and second aligned clutch members capable of relative rotation, a plurality of peripherally disposed recesses within said first member, torque transmitting elements within said second member protruding therefrom into said recesses, and a pair of thrust members spring biased toward each other engaging each of said elements at places to urge and maintain it biased into one of said recesses to transmit rotation between said clutch members, the walls of said recesses capable of camming said elements out of said recesses to permit overriding of said clutch members during certain conditions of operation.

9. In a clutch, first and second aligned clutch members capable of relative rotation, a plurality of peripherally disposed recesses within said first member, torque transmitting elements within said second member protruding therefrom into said recesses, a pair of thrust members biased toward each other into engagement with one of said elements at places to urge and maintain it biased into one of said recesses to transmit rotation between said clutch members, and a single spring for each pair of said thrust members biasing them toward each other, the walls of said recesses capable of camming said elements out of said recesses to permit overriding of said clutch members during certain conditions of operation.

10. In a clutch, first and second aligned clutch members capable of relative rotation, a plurality of elongated equally spaced recesses within said first member, elongated rotatable elements within cavities of the second member protruding therefrom into said recesses, said cavities being of a size enabling withdrawal of said elements from said recesses within the confine of said second member, a central spring chamber within said second member, a wall for each of said cavities isolating it from said chamber, a pair of thrust members within said wall protruding inwardly into engagement with one of said elements, said thrust members protruding outwardly from said wall into said chamber, and a single spring within said chamber for each pair of said thrust members active thereon to urge and normally maintain said one element into one of said recesses to transmit rotation between said members but enabling said withdrawal to permit overriding of said clutch members under certain conditions of operation.

11. In a clutch, first and second aligned clutch members capable of relative rotation, a plurality of peripherally disposed recesses within said first member, torque transmitting elements within cavities of the second member protruding therefrom into said recesses, said cavities being of a size enabling withdrawal of said elements from said recesses within the confine of said second member, a central spring chamber within said second member, wall means isolating said cavities from said chamber, thrust members carried by said wall means engaging said elements, and spring means within said chamber active on said thrust members to urge and maintain said elements biased into said recesses to transmit rotation between said clutch members but enabling said withdrawal to permit overriding of said member under certain conditions of operation.

References Cited in the file of this patent
UNITED STATES PATENTS

| | | |
|---|---|---|
| 2,164,870 | De Salardi | July 4, 1939 |
| 2,238,583 | Dodge | Apr. 15, 1941 |
| 2,441,038 | Siesel | May 4, 1948 |